United States Patent [19]
Dufresne et al.

[11] Patent Number: 4,738,941
[45] Date of Patent: Apr. 19, 1988

[54] HYDROCRACKING CATALYST FOR THE PRODUCTION OF MIDDLE DISTILLATES

[75] Inventors: Pierre Dufresne, Rueil Malmaison; Christian Marcilly, Houilles, both of France

[73] Assignee: Societe Francaise des Produits pour Catalyse Pro-Catalyse, Rueil-Malmaison, France

[21] Appl. No.: 41,946

[22] Filed: Apr. 24, 1987

Related U.S. Application Data

[63] Continuation of Ser. No. 727,640, Apr. 26, 1985, abandoned.

[30] Foreign Application Priority Data

Apr. 26, 1984 [FR] France ................... 84 06766

[51] Int. Cl.$^4$ ............................................. B01J 29/10
[52] U.S. Cl. ........................................ 502/66; 502/74
[58] Field of Search ................................. 502/66, 74

[56] References Cited

U.S. PATENT DOCUMENTS 4,054,539 10/1977 Hensley, Jr. .......................... 502/66
4,120,825 10/1978 Ward .................................. 502/66 X Primary Examiner—Carl F. Dees
Attorney, Agent, or Firm—Millen & White

[57] ABSTRACT

The invention relates to a new hydrocarbon hydroconversion catalyst, which is a mixture of an amorphous matrix, a zeolite and at least one metal of Group VIII and optionally of Group VI, the zeolite having a $SiO_2/Al_2O_3$ molar ratio of about between 8 and 70, a sodium content of less than 0.15% by weight, a unit mesh parameter $a_0$ of between 24.55 and $24.24 \times 10^{-10}$ m, a sodium ion recovery capacity $C_{Na}$, expressed in grams of sodium per 100 grams of modified zeolite, greater than 0.85, a specific surface area greater than 400 $m^2g^{-1}$, a water vapor adsorption capacity at 25° C. (with a P/Po ratio of 0.10) greater than 6% by weight, a pore distribution between 1 and 20% of the pore volume contained essentially in pores of diameters between 20 and $80 \times 10^{-10}m$, the remaining pore volume being contained essentially in pores of diameters less than $20 \times 10^{-10}$ m, the matrix being characterized by the following textural properties:

$S \geq 100$ $m^2.g^{-1}$
$Vpt \geq 0.4$ $cm^3.g^{-1}$
$V_{75} \geq 0.25$ $cm^3.g^{-1}$
$V_{75}/Vpt \geq 0.5$.

6 Claims, No Drawings

HYDROCRACKING CATALYST FOR THE PRODUCTION OF MIDDLE DISTILLATES

This application is a continuation of application Ser. No. 727,640, filed Apr. 26, 1985, now abandoned.

This application is copending with Ser. No. 717,775, filed Mar. 29, 1985 (and now abandoned) which entire disclosure is hereby incorporated by reference.

This invention relates to a new catalyst for the hydroconversion of heavy petroleum cuts, comprising as a basic constituent at least one specially modified acid type Y zeolite.

Hydrocracking of heavy petroleum cuts is a very important refining method which makes it possible to produce from excess heavy charges of low commercial value lighter fractions such as gasolines, jet fuels and light gas oils enabling the refiner to adapt his production to the demand structure. Compared with catalytic cracking, the interest of catalytic hydrocracking is to provide middle distillates, jet fuels and gas oils of very good quality. On the other hand, the gasoline produced has a much lower octane rating than that obtained from catalytic cracking.

Catalysts used in hydrocracking are all of the bifunctional type combining an acid function with a hydrogenating function. The acid function is provided by substrates of very large surface areas (about 150 to 800 $m^2.g^{-1}$) having a surface acidity, such as halogenated alumina (in particular chlorinated or fluorinated alumina), combinations of boron and aluminium oxides, amorphous silica-aluminas and zeolites. The hydrogenating function is provided either by one or several metals of Group VIII of the periodic classification of the elements, such as nickel, palladium or platinum for example, or by a combination of at least two metals chosen from Group VI of the periodic classification, (molybdenum and tungsten in particular) and Group VIII of the same classification (cobalt and nickel, in particular), at least two of the metals of this combination belonging to two different groups (VI and VIII previously mentioned).

The equilibrium between the acid and hydrogenating functions is the fundamental parameter which governs the activity and selectivity of the catalyst. A weak acid function and a strong hydrogenating function give catalysts of low activity, operating generally at a high temperature (about $\geq 390°$ C.), and at a low spatial feed rate (the VVH expressed in volume of charge treated per unit volume of catalyst per hour is generally less than 2), but they have a very good middle distillates selectivity. Conversely, a strong acid function and a weak hydrogenating function give very active catalysts but these have a very poor middle distillates selectivity.

The conventional catalysts in catalytic hydrocracking are mostly weakly acid substrates, such as amorphous silica-aluminas, for example. These systems are used to produce very good quality middle distillates, or else, when their acidity is very weak, oil bases.

Included among the low acidity substrates is the amorphous silica-alumina group. Many hydrocracking catalysts on the market consist of silica-alumina combined either with a metal of Group VIII or, preferably, when the contents of heteroatom poisons of the charge to be treated exceed 0.5% by weight, with a combination of sulfides of metals of Group VI B and VIII. These systems have very good middle distillates selectivity and the products formed are of good quality. These catalysts, so far as the least acid of these are conccerned, can also produce lubricating bases. The disadvantage of all these catalytic systems based on amorphous substrates is, as has been stated, their low activity.

Acid zeolites have the advantage over the other previously mentioned acid substrates of providing a much higher degree of acidity. The new catalysts which contain them are therefore much more active and for that reason enable operations to take place at a lower temperature and/or at a higher feed space velocity (VVH). On the other hand, this higher acidity modifies the equilibrium between the two respectively acid and hydrogenating catalytic functions. This results in an appreciable modification of the selectivity of these catalysts as compared with conventional catalysts: they have a higher cracking capability and therefore produce more gasoline than middle distillates.

This invention relates to a new type of zeolite catalyst containing a zeolite whose physical characteristics and acidity have been specially modified, and an amorphous matrix based on alumina or a combination of oxides which will be defined later, and is characterized in particular in that a large part of its pores consist of pores of diameter greater than 7.5 nm. This new type of catalyst has an appreciably greater activity and middle distillates selectivity than other systems based on zeolites of the prior art.

The zeolite used in the catalyst (2 to 80% by weight, preferably 3 to 50%) of this invention is an acid HY zeolite characterized by various specifications, whose determination methods will be detailed later in this text: an $SiO_2/Al_2O_3$ ratio of between about 8 and 70, preferably between 12 and 40; a sodium content of less than 0.15% by weight on the zeolite calcined at 1100° C.; a crystal parameter $a_o$ of the elementary mesh between $24.55 \times 10^{-10}$ m and $24.24 \times 10^{-10}$ m and preferably between $24.38 \times 10^{-10}$ m and $24.26 \times 10^{-10}$ m; a sodium ion recovery capacity $C_{Na}$ expressed in gram of Na per 100 grams of modified zeolite, neutralized and then calcinated, greater than about 0.85 (the sodium ions recovery capacity $C_{Na}$ will be defined more precisely in the following paragraph); a specific surface area determined by the B.E.T. method greater than about 400 $m^2.g^{-1}$ (preferably greater than 550 $m^2.g^{-1}$); a water vapor adsorption capacity at 25° C. for a partial pressure of 2.6 torr (346.6 Pa) ($P/P_o=0.10$), greater than about 6% by weight. A micropore distribution, determined by the B.J.H. method, of the bimodal type including in addition to the classic pore structure centred on a diameter of 0.8–0.9 nm, secondary micropores distributed more widely around a mean value of between 1.5 and 8.0 nm and preferably between 2.0 and 6.0 nm, said secondary micropores representing 1 to 20% of the pore volume of the zeolite, as defined later.

The different characteristics are measured by the methods specified below:

the $SiO_2/Al_2O_3$ molar ratio is measured by chemical analysis. When the quantities of aluminium become small, for example, less than 2%, it is preferred for greater accuracy to use an atomic adsorption spectrometric determination method.

the mesh parameter is calculated from the X-ray diffraction pattern, according to the method described in ASTM Sheet D 3.942–80. It is clear that to make this calculation correctly, the product must be sufficiently crystalline.

the specific surface area is determined from the nitrogen adsorption isotherm at the temperature of liquid nitrogen and calculated by the classic B.E.T. method. The samples are pretreated before measurement at 500° C., under a stream of dry nitrogen.

the water take-up percentages (or water vapor adsorption capacity) are determined with conventional gravimetric equipment. The sample is pretreated at 400° C. under primary vacuum and then raised to a stable temperature of 25° C. Water is then admitted at a pressure of 2.6 torr (346.6 Pa), which corresponds to a P/Po ratio of about 0.10 (ratio between the partial pressure of water admitted into the apparatus and the saturation water pressure of water at a temperature of 25° C.).

the exchange capacity of the sodium ions $C_{Na}$ (or sodium ion recovery capacity) is determined as follows: one gram of zeolite is subjected to 3 successive exchanges in 100 cm³ of a 0.2M solution of NaCl for one hour at 20° C. accompanied by thorough stirring. The solutions are left at their natural pH during the exchange process. For, if the pH were readjusted to values of about 7 by the addition of small quantities of caustic soda, the sodium exchange rates would be greater. It is expressed in grams of sodium per 100 g of modified zeolite, re-exchanged and then calcinated at 1100° C.

the micropore distribution is determined by the B.J.H method (BARRETT, JOINER, HALENDA, J of Am. Chem. Soc. Vol. 73, 1951, p. 373) based on the digital processing of the nitrogen desorption isotherm. The measurement is made with a CARLO ERBA SORPTOMATIC series 1800 apparatus. The total pore volume of the zeolite is defined here as the volume of nitrogen adsorbed (on the desorption isotherm) at a nitrogen pressure of P/Po=0.99.

These zeolites which we have shown to have a remarkable activity and selectivity in the production of medium distillates by hydrocracking are generally produced from a NaY zeolite by a suitable combination of two basic treatments: (a) a hydrothermal treatment which combines temperature and partial water vapour pressure, and (b) an acid treatment, preferably with a strong, concentrated mineral acid.

In general, the NaY zeolite from which the zeolite is prepared according to the invention has a $SiO_2/Al_2O_3$ molar ratio of between about 4 and 6; it is necessary to reduce its sodium content (weight) beforehand to a value of less than 3% and preferably 2.8%; the NaY zeolite in addition generally has a specific surface area of between 750 and 950 m²/g.

These are several preparation variants which all involve hydrothermal treatment of the zeolite followed by an acid treatment. Hydrothermal treatments are operations known in the prior art and enable so-called stabilized or ultra-stabilized zeolites to be obtained. Thus MACDANIEL and MAHER claim in U.S. Pat. No. 3,293,192 the production of so-called ultra-stable Y zeolites characterized by a crystal parameter of $24.45 \times 10^{-10}$m to $24.2 \times 10^{-10}$m and small percentages of sodium, by a combination of hydrothermal treatments and cationic exchanges by solutions of ammonium salts. KERR et al also have obtained Y zeolites enriched with silica by selective extraction of the aluminium by means of a chelating agent such as ethylene diamine tetraacetic acid (U.S. Pat. No. 3,442,795).

EBERLY et al have combined these last two procedures obtaining dealuminated zeolites (U.S. Pat. No. 3,506,400 and U.S. Pat. No. 3,591,488). They show that the hydrothermal treatment consists in selectively extracting tetracoordinated aluminium from the aluminosilicate framework. They claim this procedure as well as the subsequent treatment with solutions containing various cations. An example is given with subsequent extraction with 0.1N HCl resulting in a faujasite no longer containing any aluminium. (This example, however, was later questioned by SCHERZER, who did not succeed in obtaining the product thus described (Journal of Catalysis 54, 285, 1978)).

WARD describes the preparation of zeolite catalysts intended for use in the production of middle distillates (U.S. Pat. No. 3,853,742). The zeolite is stabilized but not treated with acid at the end of the series of treatments, and its crystal parameter is between 24.40 and $24.50 \times 10^{-10}$ m. As base for hydrocracking catalysts BEZMAN, and RABO use more highly stabilized zeolites, whose crystalline parameter varies between 24.20 and $24.45 \times 10^{-10}$ m (EP 0028938). This type of zeolite is more particularly characterized by an ion exchange capacity "IEC" of less than 0.07. Exchange capacity is defined in this patent as:

IEC: (Ion Exchange Capacity)

$$IEC = k \frac{Na_2O \text{ mol}}{SO_2 \text{ mol}}$$

k being the $SiO_2/Al_2O_3$ molar ratio determined before retro-exchange with Na+ ions. A zeolite of $SiO_2/Al_2O_3$ molar ratio equal to k, and an IEC of 0.07 give the following approximate formula:

$$H_{0.93}Na_{0.07}AlO_2(SiO_2)_{k/2}.$$

The sodium ion recovery capacity of such a product, expressed in % by weight, is:

$$C_{Na} = \frac{23 \times 0.07}{(23 \times 0.07) + 0.93 + \left(59 + \left(60 \times \frac{k}{2}\right)\right)} \times 100$$

when $k = 4.8$, $C_{Na} = 0.78$ when $k = 10$, $C_{Na} = 0.45$

Therefore, for an IEC value of less than or equal to 0.07, the sodium ion recovery capacity $C_{Na}$ is always less than 0.8.

The ultra-stabilized zeolite according to the BEZMAN and RABO method is also characterized by a hydrophobic character such that its water adsorption capacity at 25° C. and a value of P/Po of 0.1 is less than 5%.

SCHERZER (Journal of Catalysts 54, 285, 1978) synthesized some zeolites greatly enriched with silica ($SiO_2/Al_2O_3 \geqq 100$ ratio) by hydrothermal and acid treatments and characterized them by X-ray diffraction. At the same time, V. BOSACEK et al also carried out similar treatments to obtain an ultra-stable zeolite with an $SiO_2/Al_2O_3$ ratio of the order of 75.

These products are too highly dealuminated and for that reason their interest in hydrocracking is doubtful. For, a minimum number of aluminium atoms must be maintained in the structure to retain the necessary sufficient acidity of the hydrocracking catalyst.

Belgian Pat. No. 895,873 mentions the possibility of hydrocracking with a view to producing middle distillates by means of a catalyst containing Y zeolites treated with steam and then lixiviated. This ultra-stabilized zeolite is characterized by different parameters, in particular by an $SiO_2/Al_2O_3$ molar ratio greater than 10, a crystal parameter less than $24.4 \times 10^{-10}$ m, and a special mesopore distribution. All the pores of the Y zeolite not treated with steam and an acid have a diameter of less than $20 \times 10^{-10}$ m.

Ultra-stabilization treatments modify this distribution. In Belgian Pat. No. 895 873, the treatments described form mesopores centred on about $80 \times 10^{-10}$ m for a zeolite treated with steam and of about $135 \times 10^{-10}$ m for the same zeolite subsequently subjected to acid treatment.

It has now been found that the zeolites preferred as hydrocracking catalyst components for the production of middle distillates must be moderately acid, that is, have an $SiO_2/Al_2O_3$ molar ratio of between about 8 and 70, preferably between 12 and 40. Such zeolites have crystallinity retained at least at a level of 45%, which corresponds to a specific surface area of 400 m²/g, preferably 60%, which corresponds to a specific surface area of 550 m²/g, a pore distribution of between 1 and 20%, preferably between 3 and 15%, of the pore volume contained in the pores of diameter between 20 and $80 \times 10^{-10}$ m, the remaining pore volume being contained essentially in pores of diameter less than $20 \times 10^{-10}$ m.

The formation of secondary micropores with diameters between 20 and $80 \times 10^{-10}$ m, as well as the absence of mesopores beyond $80 \times 10^{-10}$ m is a characteristic feature of the invention.

It has in fact been found that the catalysts thus prepared give better results in the hydrocracking of heavy cuts for the production of middle distillates.

Without prejudging all the fundamental reasons which lead to the remarkable properties of these products, some hypotheses can be postulated.

The modification of these zeolites must be effected taking contradictory requirements into account: an increase in the $SiO_2/Al_2O_3$ ratio, the formation of secondary pores and retention of crystallinity. An increase in the $SiO_2/Al_2O_3$ ratio implies a profound remodeling of the structure which must be effected under well-defined experimental conditions, as otherwise there is a partial or total destruction of the crystalline lattice or network. The zeolite must retain good crystallinity, that is, retain an organised tridimensional lattice or network. of silicon atoms, in which remain some aluminium atoms with their associated protons. But inside this tridimensional micropore framework, there must be introduced secondary pores to facilitate the diffusion process and accessibility of the heavy molecules to the acid sites. The hydrocracking charges treated by this type of catalyst are cuts with an initial boiling point generally above about 350° C. and therefore, generally, the average number of carbon atoms of a representative molecule is between 20 and 40; the space taken up by these molecules is large and diffusion limitations prejudice the activity of the catalyst. It is therefore advantageous to form secondary micropores in the zeolite which facilitate the diffusion process and accessibility to acid sites. In the bifunctional hydrocracking mechanism it is also important that the molecular transfer between the acid sites and the hydrogenating sites be rapid. For dehydrogenated products like olefins produced by the desorption of carbocations, derived from the acid sites, must be capable of being hydrogenated rapidly, as otherwise they are subjected to other conversions on another acid site. These products are thus very reactive and after readsorption, can either be recracked or they can recombine with other molecules to give polycondensates. Both processes are prejudiciable to the good operation of the catalyst. The first leads to overcracking and degrades middle distillate selectivity in favor of the production of gasoline or even gas; the second leads to the formation of coke and degrades catalyst stability. The importance of facilitating the diffusion stages in the catalyst is therefore seen. It has been nevertheless found that the secondary micropores must consist of pores whose diameter must not exceed $80 \times 10^{-10}$ m, as otherwise the crystallinity of the zeolite would be affected.

This zeolite is shaped into a matrix which can be alumina, which contains mesopores. A catalyst is therefore obtained which preferably has primary pores of less than $20 \times 10^{-10}$ m due to the crystal framework of the zeolite, secondary pores between 20 and $80 \times 10^{-10}$ m, due to crystal faults in the zeolite lattice and finally, mesopores due to the matrix with which the zeolite is mixed.

This type of ultra-stable zeolite is obtained by a combination of hydrothermal treatments and aqueous phase treatments taking the following two precautions:

the stabilization hydrothermal treatments must be carried out under relatively milder conditions than the conventional procedures of the prior art, which makes it possible to obtain so-called ultra-stabilized zeolites, such as are described by MACDANIEL and MAHER (U.S. Pat. No. 3,293,192) or BEZMAN and RABO (EP 0028938), so that the Si/Al ratio of the aluminium silicate framework is not too high. A hydrothermal treatment is perfectly defined by the conjunction of three operating variables which are: temperature, time and partial pressure of water vapour. The sodium ion content of the starting product is also important to the extent that these ions partially block the dealumination process and promote the destruction of the lattice.

The optimum hydrothermal treatment conditions will be specified later.

The preparation of the zeolite must be terminated by a treatment in an acid medium. It has been found that this last stage has an important influence on the activity and selectivity of a hydrocracking catalyst consisting of a thus modified Y zeolite, a matrix and a hydrogenating function.

This acid treatment of the stabilized zeolite has important consequences for the physical-chemical properties of the zeolite. It modifies the specific surface area of the zeolite (measured by the BET method). The surface area of a non-modified NaY zeolite is between 750 and 950 m2/g and more commonly between 800 and 900 m²/g and that of a stabilized Y zeolite with a crystal parameter below $24.50 \times 10^{-10}$ m is usually between 350 and 750 m²/g, depending on the severity of the hydrothermal treatment selected. After acid extraction, the increase of the surface area is about 100 or higher, or even 250 m2/g according to the type of treatment, which increases the value of the surface area to between 450 and 900 m²/g. This result shows that the structure has thus been partially or totally freed from aluminum species encumbering the channels and partially blocking the micropores. This treatment slightly increases the water adsorption properties of the zeolite thus prepared. This treatment also substantially reduces the crystal parameter of the mesh. The reduction due to this treatment is between 0.04 and 4%, more generally between 0.1 and 0.3%. Lastly, this treatment has as beneficial effect the formation of a pore volume or an increase of it due to secondary pores between 1.5 and 8.0 nm in diameter (B.J.H. method). The optimum acid treatment conditions will be indicated later.

A hydrocracking catalyst containing a zeolite thus prepared, tested with a hydrotreated residue under vacuum or another conventional hydrocracking charge is much more active and middle distillate-selective than a catalyst of the previous art containing a stabilized zeolite not treated with an acid. Without prejudging the reasons for this improvement, it can be said that the acid treatment has modified the nature and force of the acid function of the catalyst as well as the accessibility of the site to heavy hydrocarbon molecules, which typically contain 20 to 40 carbon atoms per molecule.

The zeolite whose characteristics meet the criteria previously described is dispersed in a generally amorphous matrix chosen from the group constituted by aluminas $\gamma$, $\eta$, $\delta$, or $\theta$ type aluminas, mixtures of these latter, oxides, combinations of oxides of at least two of the elements chosen from boron, magnesium, aluminum, silicon, phosphorus, calcium, titanium, vanadium, chromium, manganese, iron, gallium, yttrium, zirconium, tin, lanthanum, cerium, praseodymium, neodymium and characterized by the following textural properties:

total pore volume:
$Vpt \geq 0.4$ cm$^3$.g$^{-1}$ and preferably $\geq 0.5$ cm$^3$.g$^{-1}$
Specific surface area:
$S \geq 100$ m$^2$.g$^{-1}$ and preferably $\geq 150$ m$^2$.g$^{-1}$
Pore volumes provided by pores of diameters greater than 7.5 nm:
$V_{75} \geq 0.25$ cm$^3$.g$^{-1}$, and preferably $\geq 0.35$ cm$^3$.g$^{-1}$
$V_{75}/Vpt > 0.5$ and preferably 0.6. The role of this matrix is essentially to assist shaping the zeolite, in other words, to produce it in the form of agglomerates, beads (balls), extrudates, pellets, etc., that can be used in an industrial reactor. The proportion of matrix in this catalyst is about 15 to 98% by weight, and preferably 46 to 95%. It is quite obvious that the ideal textural characteristic (surface area, Vpt, $V_{75}$) of the final catalyst cannot be defined precisely as they are closely linked to the proportions of zeolite and matrix and equally to the quantities of metal oxides (Co and/or Ni and Mo and/or W) added.

The hydro-dehydrogenation component of the catalyst of this invention is for example a compound of a metal of Group VIII of the periodic classification of the elements (in particular, nickel, palladium or platinum), or a combination of at least two of the preceding compounds, or a combination of compounds of metals (oxides, in particular) of Group VI (molybdenum and/or tungsten in particular) and non-noble metal of Group VIII (cobalt and/or nickel in particular) of the periodic classification of the elements.

The final catalyst must include between 1 and 80% by weight of specially modified zeolite, preferably between 3 and 50%. The concentrations of the metal compounds, expressed as metal compound are the following: 0.01 to 5% by weight of metals of Group VIII, and preferably between 0.03 and 3% by weight, in the case where noble metals of the palladium or platinum type are uniquely concerned, 0.01 to 15% by weight of metals of Group VIII, preferably between 0.05 and 10% by weight, in the case where non-noble metals of Group VIII of the nickel type, for example, are concerned; when at least one metal or metal compound of Group VIII and at least one compound of a metal of Group VI are used at the same time, about 5 to 40% by weight are used of a combination of at least one compound an (oxide is preferred) of a metal of Group VI (molybdenum or tungsten is preferred) and at least one metal or metal compound of Group VIII (cobalt or nickel are preferred), preferably 12 to 30%, with a weight ratio (expressed as metal oxides) of Group VIII metals to Group VI metals of between 0.05 and 0.8, preferably between 0.13 and 0.5.

Various methods of preparation can be envisaged depending on the type of product desired. There are two principal variants which differ by the number of hydrothermal treatments that are required. For moderately stabilized products, that is, moderately dealuminated with respect to the alumina silicate framework, a single treatment is sufficient; for more highly stabilized products, two treatments prove to be necessary. The prior art commonly uses values of the crystal parameter to define the stabilization level.

In order to obtain products whose crystal parameter measured at the end of the preparation lie is between $24.30 \times 10^{-10}$ m and $24.55 \times 10^{-10}$ m (moderately stabilized zeolite), it may be advantageous economically to operate with only a single hydrothermal treatment. The starting NaY zeolite conventionally has a SiO$_2$/Al$_2$O$_3$ molar ratio of between 4 and 6 and a crystalline parameter of between 24.60 and $24.80 \times 10^{-10}$ m and more generally between 24.65 and $24.75 \times 10^{-10}$ m. Before carrying out the hydrothermal treatment, the sodium content must be reduced to at least 3% by weight and preferably by less than 2.8% by weight. This is done conventionally by repeated exchanges in solutions of an ionizable ammonium salt, such as the nitrate, chloride, sulfate or equivalents. The NH$_4$NaY zeolite thus obtained can be maintained calcinated under the following conditions: temperature between about 500° and 880° C. preferably between 600° and 830° C., partial pressure of water vapour between about 0.05 and 10 bars and preferably between 0.1 and 5 bars, and a time of at least 20 minutes and preferably longer than 1 hour.

The zeolite thus stabilized is treated with a dilute solution of an organic or inorganic acid, such as hydrochloric, nitric, sulfuric, phosphoric, acetic, oxalic, formic acid or equivalents, or with a complexing agent.

To obtain zeolites with a parameter ranging from 24.24 to $24.35 \times 10^{-10}$ m, it is preferable to operate two hydrothermal treatment stages. The first is carried out under conditions which can be very mild to the product whose sodium content may be relatively high but always less than 3% and preferably 2.8%, preferably at a temperature between 530° and 700° C., preferably at a minimum partial pressure of water vapour of 20 torr (0.026 bars) and a time of at least 20 minutes, and if possible longer than 1 hour. The product is then made to undergo one or several exchanges in solutions of an ionizable ammonium salt, or else in solutions of an organic or inorganic acid, on condition, however, that the pH of the final solution be preferably less than 0.5. It is also possible to use a combination of these two types of exchange or mix the acid with a solution of ammonium salts. The sodium content is then less than 1% and preferably 0.7%. A second hydrothermal treatment is then carried out under more severe conditions than in the first, namely, at a temperature between 600° and 900° C. and preferably between 650° and 850° C. (the temperature of the second hydrothermal treatment being about 20° to 250° C. above that in the first treatment), preferably at a partial pressure of water vapour greater than 20 torrs (0.026 bar) and preferably at 200 torrs (0.26 bar)

and a time of at least 30 minutes and preferably longer than 1 hour.

The hydrothermal treatment or treatments is or are followed by one or several extraction treatments in solutions of an organic or inorganic acid, such as hydrochloric, nitric, sulfuric, perchloric, phosphoric, acetic, oxalic, formic acids or equivalents. It is also possible to use complexing agents like those of the prior art, such as ethylene diamine tetraacetic acid, acetylacetone or equivalents. However, the preferred treatments are carried out with solutions of hydrochloric or nitric acids of normality between 0.1 and 11N, preferably between 0.5 and 3N. To respect the crystallinity of the zeolite, it may be advantageous to carry out several mild treatments successively, that is to say, in acid solutions of weak normality, rather than one treatment under more severe conditions, that is, in a concentrated acid; the acid treatments thus described can always be followed or preceded by one or several classic exchanges with ammonium salts with a view to reducing the sodium content of the final zeolite. This ion exchange can take place without any disadvantage simultaneously with the acid treatment by adding the acid to the aqueous solution of ammonium salt. It is also possible after these acid treatments to carry out exchanges with Group IIA metal cations, rare earth cations, or else chromium or zinc cations, or with any other element that can improve the catalyst.

The HY or NH$_4$Y zeolite thus obtained can be introduced at this stage into the amorphous matrices mentioned previously. One of the preferred methods in this invention consists in mixing the zeolite with a moist alumina gel for some tens of minutes and then pass the paste thereby obtained through a die to form extrudates of a diameter between 0.4 and 4 mm.

The hydrogenating function such as has been defined before (metals of Group VIII or combinations of metal oxides of Groups VI and VIII) can be introduced into the catalyst at various stages of preparation in various ways.

It is possible also to introduce only a part of said hydrogenating function (in the case of a combination of metal oxides Groups VI and VIII) or all of said function when mixing the zeolite with the oxide gel chosen as matrix. It can be introduced by one or several ion exchange operations on the calcinated substrate consisting of an HY zeolite dispersed in the chosen matrix by means of the solutions containing the salts, precursors of the metals chosen when they belong to Group VIII. It can be introduced by one or several impregnations of the shaped and calcinated substrate, by means of a solution of metal oxide precursors of metals of Group VIII (Co and/or Ni are preferred) when the precursors of the oxides of metals of Group VI (Mo and/or W) have previously been introduced at the time the substrate was being mixed.

Lastly it can be introduced by one or several impregnations of the calcinated substrate consisting of an HY zeolite and the matrix, using solutions containing the precursors of the oxides of metals of Group VI and/or VIII, the precursors of the oxides of metals of Group VIII being preferentially introduced after those of Group VI or at the same time as these. The principal precursor salts which can be used are for example:

for Group VIII (cobalt or nickel): nitrate, acetate, sulfate, hydrated bivalent cations or hexamine cations Co(NH$_3$)$_6^{2+}$ and Ni(NH$_3$)$_6^{2+}$ for Group VI (Mo or W): the various known molybdates or ammonium tungstates.

In the case of the metal oxides being introduced into several impregnations of the corresponding precursor salts, an intermediate catalyst calcination stage must be carried out at a temperature between 250° and 600° C.

The impregnation of the molybdenum can be facilitated by the addition of phosphoric acid to the ammonium paramolybdate solutions.

The catalysts thereby obtained are used for hydrocracking heavy cuts and have an improved activity as compared with the prior art, and have an improved selectivity for the production of middle distillates of very good quality.

The charges used in this method are gas oils, gas oils under vacuum, deasphalted or hydrotreated residues or equivalents. They consist of at least 80% by volume of compound whose boiling points are between 350° and 580° C. They contain heteroatoms such as sulphur and nitrogen. The hydrocracking conditions such as temperature, pressure, hydrogen recycling rate, hourly volume rate, must be adapted to the nature of the charge, characterized in particular by the range of boiling points, the aromatic and polyaromatic contents, the heteroatoms contents. The nitrogen contents are generally between 5 and 2000 ppm, and the sulphur contents between 50 and 30,000 ppm.

The temperatures are generally above 230° C. and often between 300° C. and 430° C. The pressure is greater than 15 bar and generally greater than 30 bar. The hydrogen recycling rates are at a minimum 100 and often between 260 and 3000 liters of hydrogen per liter of charge. The hourly volume rate is in general between 0.2 and 10.

The results which matter to the refiner are middle distillate activity and selectivity. The objectives laid down can be achieved under conditions compatible with economic realities. Thus the refiner seeks to reduce the temperature, pressure, the hydrogen recycling rate and to maximize the hourly volume rate. It is known that conversion can be increased by increasing the temperature, this is often to the detriment of selectivity. Middle distillate selectivity improves with increase of pressure or hydrogen recycling rate, but this is to the detriment of the economics of the process. This type of catalyst makes it possible under conventional operating conditions to obtain selectivities for distillation products whose boiling point is between 150° and 380° C. of more than 65%, with a conversion level of products, of boiling points less than 380, greater than 55% by volume. In addition, under these conditions, this catalyst has a remarkable stability, which is due in particular to the great specific surface area of the product. Finally, because of the composition of the catalyst and the quality of the zeolite, the catalyst is easily regenerated.

The characteristics of the invention are specified by some examples given below:

EXAMPLE 1

Preparation of a HY zeolite stabilized and treated with an acid

A NaY zeolite of formula NaAlO$_2$ (SiO$_2$)$_{2.5}$ is used. This zeolite whose characteristics are:
SiO$_2$/Al$_2$O$_3$ molar ratio: 5
crystal parameter: 24.69 × 10$^{-10}$ m.

Water vapor adsorption capacity at 25° C. (at $P/P_o$: 0.1): 26%

Specific surface area: 880 m²/g is subjected to four consecutive exchanges in 2M concentration solutions of ammonium nitrate at a temperature of 95° C. for 1 h 30 and a ratio of volume of solution to weight of zeolite of 8. The sodium content of the NaNH$_4$ zeolite obtained was 0.95% by weight. This product was then introduced rapidly into a pre-heated oven at 770° C. and allowed to remain in it for 4 hours in a static atmosphere (therefore in the absence of any scavanging gas). The zeolite was then subjected to an acid treatment under the following conditions: the ratio of the volume of 2N nitric acid to the weight of solid was 6, the temperature was 95° C. and the time 3 hours. Another treatment under the same conditions was then carried out, but with a 0.3N acid. The SiO$_2$/Al$_2$O$_3$ molar ratio was then 18, the residual sodium content 0.1%, the crystal parameter 24.32, the specific surface area 805 m²/g, the water take-up capacity 13.7%, the sodium ion recovery capacity 1.8% by weight, the pore volume percentage contained in pores of diameters of 25 to $60 \times 10^{-10}$ m, 11%, the remaining pore volume being contained in pores of diameter less than $20 \times 10^{-10}$ m.

EXAMPLE 2

Preparation of an HY zeolite stabilized and treated with an acid

The NaY zeolite used in example 1 was subjected to 2 exchanges in solutions of ammonium chloride in a manner such that the sodium content was 2.5%. The product was then introduced into a cold oven and calcinated under dry air to up to 400° C. At this temperature a flow of water, after vaporisation, was introduced into the calcination atmosphere at a partial pressure of 380 torrs (50661 Pa). The temperature was then raised to 565° C. for 2 hours. The product was then subjected to exchange with a solution of ammonium chloride followed by very careful acid treatment under the following conditions: volume of 0.4N hydrochloric acid to weight of solid 10, time 3 hours. The sodium content then dropped to 0.6%, the SiO$_2$/Al$_2$O$_3$ ratio being 7.2. This product was then subjected to self-steaming at 780° C. for 3 hours and then taken up again in an acid solution with 2N hydrochloric acid and a ratio of solution volume to weight of zeolite of 10. The crystal parameter was $24.28 \times 10^{-10}$ m, the specific surface area was 825 m²/g, the water take-up capacity was 11.7, the sodium ion recovery capacity 1.2% by weight. The sodium content was 0.05% by weight and the percentage of pore volume contained in pores of diameter between 2 and 6 mm, 13%, the rest of the pore volume being contained in pores of diameter less than $20 \times 10^{-10}$ m.

EXAMPLE 3

Preparation of catalysts A and B according to this invention

The zeolites of examples 1 and 2 were used to prepare catalysts whose composition by weight was as follows:
13.5% for zeolite
4.5% NiO
15% MoO$_3$
67% Al$_2$O$_3$ (matrix)

The starting alumina was a pseudo-boehmite obtained by the hydrolysis of an aluminum alcoholate. It is in particular marketed by the Société CONDEA under the name of PURAL (comparable product CATAPAL marketed in the USA by the Conoco Chemical Division of the Continental Oil Company) and can be obtained in several different grades corresponding to the dimensions D of the various alumina particles:

PURAL SB: dimensions D of the particles distributed around about 10 nm

PURAL 100: dimensions D distributed around a bout 20 nm

PURAL 200: dimensions D distributed around about 40 nm.

For this example, the alumina grade selected was PURAL SB.

This alumina was first peptised by addition of nitric acid so as to obtain a paste, carefully mixed and kneaded with zeolite and then extruded through a 1.6 mm diameter die, dried at 120° C. for 16 hours and calcinated at 500° C. for 2 hours, the rise in temperature being at a rate of 2.5° C. per minute. The substrate obtained was then impregnated in two successive steps with a solution of ammonium heptamolybdate and then nickel nitrate, these two stages being separated by a calcination operation at 400° C. lasting 2 hours. The catalyst was finally calcinated at 500° C. for 2 hours. To the zeolite described in example 1 corresponds Catalyst A and that of example 2 Catalyst B. Catalysts A and B have specific areas respectively of 247 m².g$^{-1}$ and 258 m².g$^{-1}$.

PURAL SB alumina peptised and kneaded alone (no addition of nickel and molybdenum salts, or zeolite), extruded, and then calcinated as before (2 hours, 500° C.) has the following textural characteristics which conform to the properties required for the matrix of this invention, i.e.:

$S = 218$ m².g$^{-1}$
$Vpt = 0.62$ cm³.g$^{-1}$
$V_{75} = 0.45$ cm³.g$^{-1}$
$V_{75}/Vpt = 0.77$
$Na = 0.004\%$ by weight.

EXAMPLE 4

Comparative

Preparation of catalyst C and D.

From the zeolites of examples 1 and 2, a preparation comparable to that of example 3 was repeated to obtain catalyst C and D, having a chemical composition identical with that of catalysts A and B, but starting from an alumina different from that of the preceding example.

The starting alumina used in this example was a hydrated alumina of bayerite structure obtained by precipitation from a solution of aluminium nitrate and then maturing at a pH of about 11. The hydrooxide obtained was filtered, washed several times and then dried at 150° C. for 1 hour.

Catalysts C and D obtained form this alumina had specific surface areas respectively of 314 m².$^{-1}$ and 303 m².g$^{-1}$.

Pure alumina extrudates obtained according to a procedure similar to that used for the substrate of catalysts C and D from the start alumina used for the preparation of these same catalysts, had the following textural characteristics ($V_{75}$ and $V_{75}/V_{pt}$ not conforming here to the invention).:

$S = 297$ m².g$^{-1}$
$Vpt = 0.51$ cm³.g$^{-1}$
$V_{75} = 0.21$ cm³.g$^{-1}$
$V_{75}/Vpt = 0.41$
$Na = 0.009\%$ of weight

EXAMPLE 5

Preparation of catalyst E according to this invention

A silica/alumina of composition by weight of 25% $SiO_2$-75% $Al_2O_3$ was prepared in the following successive steps:

(1) neutralization of a sodium silicate solution with $HNO_3$
(2) washing of the silica gel obtained
(3) addition of an aluminium nitrate solution to the silica gel suspension
(4) addition of ammonia to precipitate aluminium hydroxide
(5) washing and filtration of the silica-alumina gel obtained to remove the maximum number of interfering ions ($Na^{30}$, $No_3^-$).

Catalyst E was prepared by carefully incorporating the zeolite of example No. 1 in the silica alumina thereby obtained, by kneading the mixture and extruding it through a 1.6 mm die, and then calcinating the extrudates at 500° C. for 2 hours at a temperature rise rate identical with that of example 3. The substrate obtained was then impregnated in the same way as that defined in example 3 and finally calcinated at 500° C. for 2 hours. The final catalyst E had the following composition by weight:

13.5% zeolite
4.5% NiO
15% $MoO_3$
67% $Al_2O_3$

The pure silica-alumina obtained in this example, mixed and extruded under the same conditions as that for the catalyst E substrate, had the following textural characteristics conforming to the invention:

$S = 440$ $m^2.g^{-1}$
$Vpt = 0.9$ $cm^3.g^{-1}$
$V_{75} = 0.56$ $cm^3.g^{-1}$
$V_{75}/Vpt = 0.62$
$Na = 0.026\%$ by weight

EXAMPLE 6

Comparative

Preparation of catalyst F

This new catalyst F was prepared under the conditions and according to a method comparable to that of example 5, but the procedure for the synthesis of silica-alumina was modified so as to improve the combination of aluminium oxides and silicon. To achieve this result, the duration of the silica gel maturing and washing stages in particular can be shortened, to avoid or limit its ageing; the alumina can be precipitated very slowly by the gradual addition of ammonia so as to limit local composition heterogeneities which promote the formation of large alumina particles in a not very combined state with silica; lastly, the silica-alumina gel obtained between 50° and 80° C. can be matured for several hours to improve the combination of oxides.

A pure silica-alumina thereby obtained, used in this example to prepare catalyst F, was mixed, extruded and calcinated under the same conditions as the catalyst E substrate. It had the following textural characteristics ($V_{75}/V_{pt}$ does not conform to the invention):

$S = 518$ $m^2.g^{-1}$
$Vpt = 0.78$ $cm^3.g^{-1}$
$V_{75} = 0.32$
$V_{75}/Vpt = 0.40$
$Na = 0.0032\%$ by weight

EXAMPLE 7

High pressure test conditions

The catalyst whose preparations have been described in the preceding examples were used under hydrocracking conditions with a charge whose characteristics were as follows:

Charge Initial point 318° C.
Point 10% 378
Point 50% 431
Point 90% 467
Final point 494
Density $d_4^{20}$ 0.854
N (ppm) 980
%S 1.92 (weight)

The catalyst test unit included a fixed bed reactor with an "up flow" arrangement into which were introduced 60 ml of catalyst. The catalyst was pre-sulfided with an $H_2/H_2S$ mixture (97-3) up to 420° C. The pressure was 120 bars, the recycling of hydrogen was 1000 liters per liter of charge, the hourly volume rate 1.

EXAMPLE 8

Results obtained with catalysts A, B, C and D

The catalysts were compared at an appreciably similar conversion rate and therefore at slightly different temperatures.

Conversion is defined as being the fraction collected at the boiling point below 380° C.

Selectivity is defined as being the fraction collected at a boiling point between 150° and 380° C., related to the conversion.

The results are given in the following table:

| CATALYST | T °C. | CONVERSION | SELECTIVITY |
|---|---|---|---|
| A | 355 | 81.8 | 76.2 |
| B | 360 | 80.1 | 78.1 |
| C | 365 | 80.5 | 69.5 |
| D | 370 | 79.7 | 70.4 |

This table shows that catalyst A and B prepared according to this invention have a greater middle distillate activity and selectivity than Catalysts C and D.

EXAMPLE 9

Results obtained with Catalysts E and F
The results are given in the following table:

| CATALYST | T °C. | CONVERSION | SELECTIVITY |
|---|---|---|---|
| E | 360 | 80.2 | 74.9 |
| F | 365 | 78.1 | 68.6 |

Catalyst E prepared according to this invention has a greater activity and selectivity than Catalyst F.

EXAMPLE 10

Low pressure test conditions

Catalysts A and C were compared in a low pressure test on a charge relatively slightly contaminated with sulfur and nitrogen. The test was carried out under low pressure hydrocracking conditions on a previously hydrotreated charge.

A residue under vacuum, of density ($d_4^{20}$) 0.906, and sulfur content of 2.37% by weight was hydrotreated at 60 bars using a conventional non-acid catalyst; the distillate collected and the 295-500 cut were in their turn hydrocracked using catalysts A and B at 60 bars. The characteristics of the charge were as follows:

$d_4^{20} = 0.871$
S(ppm) = 500
N (ppm) = 130

The pressure was 60 bars, the hydrogen recycling of 700 liters of hydrogen per liter of charge, the hourly volume rate 1.

EXAMPLE 11

Results obtained with catalysts A and C in the low pressure test

Conversion and selectivity are defined as in example 8. This operation here was carried out substantially at the same temperatures for both catalysts.

The results are given in the following table:

| CATALYST | T   | CONVERSION | SELECTIVITY |
|----------|-----|------------|-------------|
| A        | 350 | 76.5       | 57.2        |
|          | 340 | 64.3       | 69.6        |
| C        | 350 | 71.2       | 52.8        |
|          | 340 | 59.7       | 65.1        |

What is claimed is:

1. A catalyst containing by weight
   (a) about 15 to 98% of a matrix comprising a $\gamma$, $\eta$, $\delta$ or $\theta$ alumina, a mixture thereof, silica or a silica-alumina, said matrix having the following textural properties:
   $V_{pt} \geq 0.5$ cm$^3$.g$^{-1}$
   $S \geq 150$ m$^2$.g$^{-1}$
   $V_{75} \geq 0.35$ cm$^3$.g$^{-1}$
   $V_{75}/V_{pt} \geq 0.6$
   (b) about 1 to 80% of a zeolite having:
   an SiO$_2$/Al$_2$O$_3$ molar ratio of about between 12 and 40;
   a sodium content less than 0.15% by weight determined on the zeolite calcinated at 1100° C.;
   a unit mesh parameter a° of between $24.38 \times 10^{-10}$ m and $24.6 \times 10^{-10}$ m;
   a sodium ion recovery capacity $C_{Na}$, expressed as grams of sodium per 100 grams of neutralized and calcinated modified zeolite, greater than about 0.85;
   a specific surface area greater than about 500 m$^2$.g$^{-1}$;
   a water vapor adsorption capacity at 25° C. (with a P/Po ratio of 0.10) greater than 6% by weight;
   a pore distribution between 3 and 15% of the pore volume comprising pores of diameters between 20 and $80 \times 10^{-10}$ m, the remaining pore volume comprising essentially pores of diameteres less than $20 \times 10^{-10}$ m;
   (c) 0.05 to 10% by weight of nickel or compound of nickel in combination with at least one compound of molybdenum, the total concentration of nickel or nickel compound and of molybdenum compound being between 12 and 30%, the weight ratio (expressed as metal oxides) of nickel/molybdenum being between 0.05 and 8,
   said catalyst produced by a process comprising the steps of: preparing the zeolite from an NaY zeolite generally having an SiO$_2$/Al$_2$O$_3$ molar ratio between 4 and 6, a crystalline parameter between $24.60 \times 10^{-10}$ m to $24.80 \times 10^{-10}$ m and a surface area of generally between about 750 and 950 m$^2$/g, the preparation of the zeolite consisting essentially of:
   reducing the sodium content of the NaY zeolite to a value of less than 3% by weight by at least one exchange with a solution of an ionizable ammonium salt in order to obtain an NH$_4$NaY zeolite,
   calcinating between about 770° and 780° C. the NH$_4$NaY zeolite in at least one stage (hydrothermal treatment) at a partial water vapor pressure between 0.05 and 10 bars for more than 1 hour, to obtain a stabilized zeolite,
   treating the stabilized zeolite in at least one stage with at least one solution of an organic or inorganic acid or acid complexing agent.

2. A catalyst according to claim 1 in which the preparation of the zeolite consists essentially of:
   reducing the sodium content of the Y—Na zeolite to a value below about 2.8% by weight by at least one exchange with a solution of an ionizable ammonium salt in order to obtain an NH$_4$NaY zeolite,
   calcinating the NH$_4$NaY zeolite in one stage (hydrothermal treatment) at 770°-780° C. under a partial water vapor pressure between about 0.1 and 5 bars for more than one hour to obtain a stabilized zeolite,
   treating said stabilized zeolite in at least one stage with a solution of hydrochloric acid or nitric acid of a normality between 0.1 and 11N.

3. A catalyst according to claim 1, produced by a process comprising the steps of: preparing the zeolite from a Y—Na zeolite generally having an SiO$_2$/Al$_2$O$_3$ molar ratio between about 4 and 6, a crystalline parameter between 24.65 and $24.75 \times 10^{-10}$ m and a specific surface area generally between about 800 and 900 m$^2$/g, and wherein the preparation of the zeolite consists essentially of:
   reducing the sodium content of the Y—Na zeolite to a value less than 3% by weight by at least one exchange with a solution of ionizable ammonium salt in order to obtain an NH$_4$NaY zeolite,
   subjecting the NH$_4$NaY zeolite to a first hydrothermal treatment, in at least one stage, at a temperature between 530° and 700° C, under a partial water vapor pressure of at least 0.026 bar for at least 20 minutes,
   reducing the sodium content to a value of less than 1% by weight, by at least one exchange with at least one solution of at least one ionizable ammonium salt, by treatment with at least one solution of at least one organic or inorganic acid, or by simultaneous exchange with at least one solution of at least one ionizable ammonium salt and a treatment with at least one solution of at least one organic or inorganic acid,
   subjecting the zeolite thus treated to a second hydrothermal treatment in at least one stage at a temperature about 770°-780° C., for more than one hour,
   treating the zeolite in at least one stage by at least on solution of organic or inorganic acid, or an acid complexing agent.

4. A catalyst according to claim 2, wherein the normality of the hydrochloric or nitric acid solution is between 0.5 and 3N.

5. A catalyst according to claim 3, wherein the sodium content of the zeolite is reduced to a value of less than 2.8% by weight prior to the first hydrothermal treatment, and is reduced to a value of less than 0.7% by weight subsequent to said treatment.

6. A process according to claim 1, wherein the catalyst is prepared by a process comprising mixing a matrix with a zeolite and introducing in one or several stages, either into the matrix or into the zeolite, or into a mixture thereof, the nickel or nickel compound and the molybdenum compound.

* * * * *